(12) United States Patent  
DeHaan et al.

(10) Patent No.: US 8,671,404 B2  
(45) Date of Patent: Mar. 11, 2014

(54) DISTRIBUTING AND MANAGING VIRTUAL MACHINES

(75) Inventors: Michael Paul DeHaan, Morrisville, NC (US); Adrian Karstan Likins, Raleigh, NC (US); Scott Wayne Seago, Groton, MA (US)

(73) Assignee: Red Hat, Inc., Raleigh, NC (US)

( * ) Notice: Subject to any disclaimer, the term of this patent is extended or adjusted under 35 U.S.C. 154(b) by 1409 days.

(21) Appl. No.: 12/029,637

(22) Filed: Feb. 12, 2008

(65) Prior Publication Data

US 2009/0204961 A1 Aug. 13, 2009

(51) Int. Cl.
*G06F 9/455* (2006.01)
*G06F 9/46* (2006.01)
*G06F 15/173* (2006.01)

(52) U.S. Cl.
USPC .............. 718/1; 718/100; 718/102; 718/104; 718/105; 709/223; 709/224; 709/226

(58) Field of Classification Search
USPC .......................................................... 718/1
See application file for complete search history.

(56) References Cited

U.S. PATENT DOCUMENTS

| | | | |
|---|---|---|---|
| 6,490,445 B1 * | 12/2002 | Holmes | 455/419 |
| 7,263,699 B2 * | 8/2007 | Jacquemot et al. | 717/174 |
| 7,356,576 B2 * | 4/2008 | Rabe | 709/221 |
| 7,356,679 B1 * | 4/2008 | Le et al. | 713/1 |
| 7,577,722 B1 * | 8/2009 | Khandekar et al. | 709/220 |
| 2002/0069335 A1 * | 6/2002 | Flylnn, Jr. | 711/153 |
| 2002/0069369 A1 * | 6/2002 | Tremain | 713/201 |
| 2002/0120660 A1 * | 8/2002 | Hay et al. | 709/100 |
| 2002/0194482 A1 * | 12/2002 | Griffin et al. | 713/176 |
| 2005/0246711 A1 * | 11/2005 | Berstis et al. | 718/105 |
| 2006/0294517 A1 * | 12/2006 | Zimmer et al. | 718/1 |
| 2007/0234302 A1 * | 10/2007 | Suzuki et al. | 717/126 |
| 2007/0234337 A1 * | 10/2007 | Suzuki et al. | 717/168 |
| 2007/0300220 A1 * | 12/2007 | Seliger et al. | 718/1 |
| 2008/0089338 A1 * | 4/2008 | Campbell et al. | 370/392 |
| 2008/0098392 A1 * | 4/2008 | Wipfel et al. | 718/1 |
| 2008/0168158 A1 * | 7/2008 | Bantz et al. | 709/219 |
| 2008/0201709 A1 * | 8/2008 | Hodges | 718/1 |
| 2009/0094316 A1 * | 4/2009 | Chen et al. | 709/203 |

\* cited by examiner

*Primary Examiner* — Emerson Puente
*Assistant Examiner* — Charles Swift
(74) *Attorney, Agent, or Firm* — Lowenstein Sandler LLP

(57) ABSTRACT

An embodiment relates generally to a method of distributing virtual machines. The method includes specifying a set of requirements for a virtual machine and instantiating a virtual machine based on a lightweight reusable profile, based on the set of requirements as described in the profile. The method also includes importing the profile to a distribution server; and distributing the profile to at least one physical machine in response to a request. Software can be added to the at least one physical machine that can manage the deployment of the physical hosts as a farm to hosting the virtual images.

22 Claims, 3 Drawing Sheets

DISTRIBUTING AND MANAGING VIRTUAL MACHINES

FIELD

This invention relates generally to virtual machines, more particularly, to systems and methods for distributing and managing virtual machines.

DESCRIPTION OF THE RELATED ART

A virtual machine architecture logically partitions a physical machine, such that the underlying hardware of the machine is time-shared and appears as one or more independently operating virtual machines (VMs). A Virtual Machine Monitor (VMM) runs on a computer and facilitates for other software the abstraction of one or more VMs. Each VM may function as a self-contained platform, running its own operating system (OS) and application software. The software running in a VM is collectively referred to herein as guest software.

One advantage of a virtual machine over a real machine is the ability to quickly and cheaply create multiple instances of VMs. If allowed by the virtual machine implementation, multiple VMs can exist simultaneously in a single host machine (host computer system) environment. Resources of the host machine can be divided among the various VMs. For example, a single host machine with four processors and 1 gigabyte of random access memory (RAM) could be divided evenly into four VMs, each of which is given one processor and 256 megabytes of RAM. Other resource allocation divisions are possible.

This flexible resource allocation becomes even more useful when combined with the ability to move VMs from one host machine to another. This allows for "load balancing" of systems. For example, if a VM requires more processing power than is available on one host machine, it can be moved to another host machine that has extra capacity.

In some computing environments, it is useful to have multiple machines that are nearly identical in configuration (both hardware and software). For example, a large electronic-commerce web site such as Amazon.com, Yahoo.com, or Ebay.com have dozens or hundreds of web servers that are all nearly identical in configuration. This setup allows for easy expandability. When current capacity is inadequate, additional servers can quickly be brought on line. Hardware isolation allows for buying of additional machines without having to requalify software on new machines, and possibly new operating systems.

Another case where nearly-identical configurations are useful is in the testing of configuration modifications. When dealing with mission-critical applications, IT managers often want to test software configuration changes before applying them to the production system. For example, if a new "security patch" was made available by Microsoft Corporation for the Windows operating system, a Linux package update, UNIX update or other computer application update, an administrator may want to test this patch on a separate server machine before installing the patch on the production server.

Although VMs have many advantages, they also have some drawbacks and limitations that affect their deployment. For example, a typical VM is a binary file that is manually constructed and distributed. The binary file is large and requires a large communication bandwidth to download at a remote site or requires a large amount of time. Moreover, the construction of the binary file can be tedious and time consuming.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
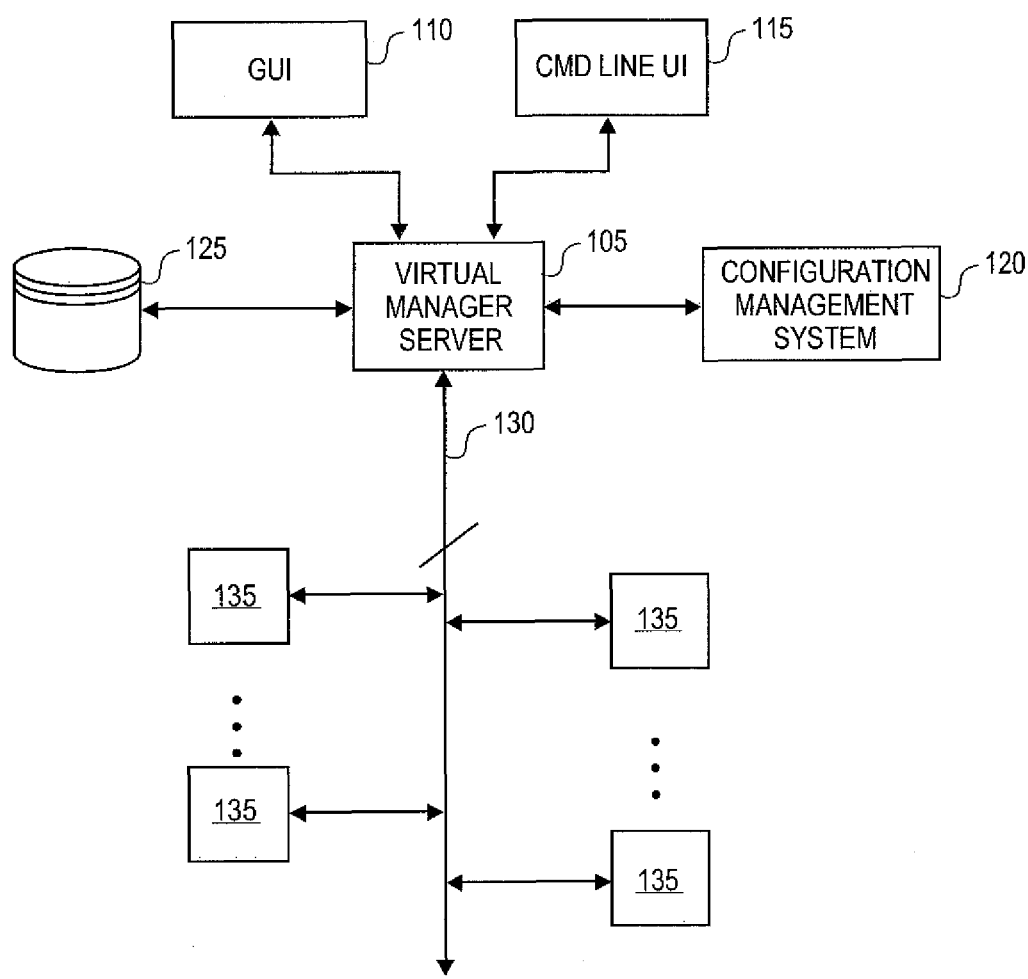
FIG. 1 depicts an exemplary system in accordance with various embodiments.

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for virtual appliance management and distribution. More particularly, a virtual manager system can comprise user-interface ("UI") modules, at least one database, a configuration management system and a virtual manager server. In one aspect, the virtual manager system creates, manages and distributes virtual machines based on a virtual profile. The virtual profile provides a lightweight and standardized container for users to create and distribute virtual machines. The virtual profile is very small in terms of size, easy to transport, and share on the Internet. Accordingly, the virtual profile can offer a savings over binary image file transfer to describe configurations that match a specific pattern, e.g., "virtual machines." The UI modules can comprise a web interface and/or command line interface that allow a user to specify a virtual machine and manage the virtual machine, i.e., start, stop, pause, migrate, reallocate, etc. The database can be configured to store information about what profiles are imported, what distribution packages are available, what systems are being tracked, what virtual machines have been deployed (and where), and so forth. In some embodiments, the database can be configured to track the executing tasks. The configuration management system can be configured to provide centralized management of the virtual machines being managed by the virtual manager system.

The virtual manager server can couple with at least the UT modules, the database and the configuration management system. The virtual manager server can also be configured to couple with physical machines through a message bus. As machines are registered with the virtual manager server, users can specify the type of virtual machine by profile (e.g., an email server, a database server, etc.) to a selected physical machine. The virtual manager server can then install the specified virtual machine to the selected physical machine via the selected profile. Moreover, the virtual manager server can then manage the instance of the virtual machine under the direction of user through the UI modules.

FIG. 1 illustrates an exemplary virtual machine distribution system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a virtual manager server 105, a graphical user interface (e.g., a Web-based user interface) 110, a command line interface 115, a configuration management system 120, and a database 125. The virtual manager server 105 can be configured to provide the distribution and management infrastructure (i.e., a distribution server) to distribute virtual machines as well as to manage deployed virtual machines. Accordingly, the virtual manager server 105 can comprise additional software/hardware components to implement the functions previously described and described in greater below.

The virtual manager server 105 can also be coupled to the graphical user interface ("GUI") 110 and the command line interface 115. The GUI 110 can be configured to provide a graphical user interface for users to interact with system 100. The GUI 110 can be implemented with graphical interface toolkits known to those skill to the art or a web-based toolkits such as Ruby on Rails™. The GUI 110 can provide drop-down menus, screens, dialog boxes, widgets, etc. to allow users to create, deploy, and manage virtual machines.

Similarly, the command line interface 115 can provide the same or similar functionality as the GUI 110. The command line interface 115 can be implemented as a command shell in the underlying operating system of virtual manager server 110. In some embodiments, the command line interface 115 provides an alternative mechanism of interaction for the users who prefer the speed or scripting ability of shell commands.

In some, embodiments, both interfaces 110, 115 can be configured to provide a network application program interface ("API") for control of the deployed virtual machines via common standard network protocols such as XMLRPC and/or SOAP as known to those skilled in the art.

The virtual manager server 105 can be further coupled to the configuration management system 120, which is configured to provide centralized management of the virtual machines being managed by the system 100. The configuration management system 120 can be implemented by an open source configuration management system such as Puppet™ (from Reductive Labs, LLC), Cfengine, or Bcfg2, a proprietary configuration management system or combinations thereof.

The virtual manager server 105 can be further coupled to the database 125, which is configured to provide storage and access to information regarding what profiles are imported, what distribution packages are available, what systems are being tracked, what virtual machines have been deployed (and where), and other information as deemed necessary by the system administrator.

The system 100 can also comprise a message bus 130 coupled to the physical machines 135. The message bus 130 can be implemented using QPID or other similar message bus technology in some embodiments. The message bus 130 can be configured to provide a communication medium between the virtual manager server 105 and the physical machines, where command and data can be exchanged.

The physical machines 135 can be physical implementation of computing platforms such as personal computers, laptops, wireless devices, clients, workstations, etc. The physical machines 135 can be equipped with at least one processor, a persistent storage device (e.g., a hard drive), non-persistent memory (e.g., random access memory), a monitor and/or input/output peripherals e.g., mouse, keyboard, etc.).

According to various embodiments, a user can create a virtual machine, e.g., a web server, an electronic mail server, etc., using the user interface (either GUI 110 or command line interface 110). The virtual manager server 105 can create a profile based on the requirements for the desired virtual machine. The user can then store the profile in the database 125 through the interfaces 110, 115. The profile could also be created outside the system, as it is represented as a simple text file, stored in XML or a similar format. The user can also deploy the profile to a physical machine 135 through the interfaces 110, 115. Deploying the profile could result in the installation of a new operating system on the physical machine (which may or may not already be running an operating system), or begin the installation of a new virtual guest OS, as chosen by the user.

The user can also manage any deployed virtual machines on the physical machines 135 through the interfaces 110, 110. For example, a user can stop, start, pause, delete, and/or migrate the virtual machines. Other commands can be executed as deemed necessary by the system administrator. In some embodiments, the virtual manager server 105 can also manage the physical hardware underneath the virtual machines as well. For example, the virtual manager server 105 can install or provision the physical machines from bare metal to install any software that will automatically add them to a collective "server farm" as well as the software needed to enable installing virtual machines onto them later.

Figure 2:
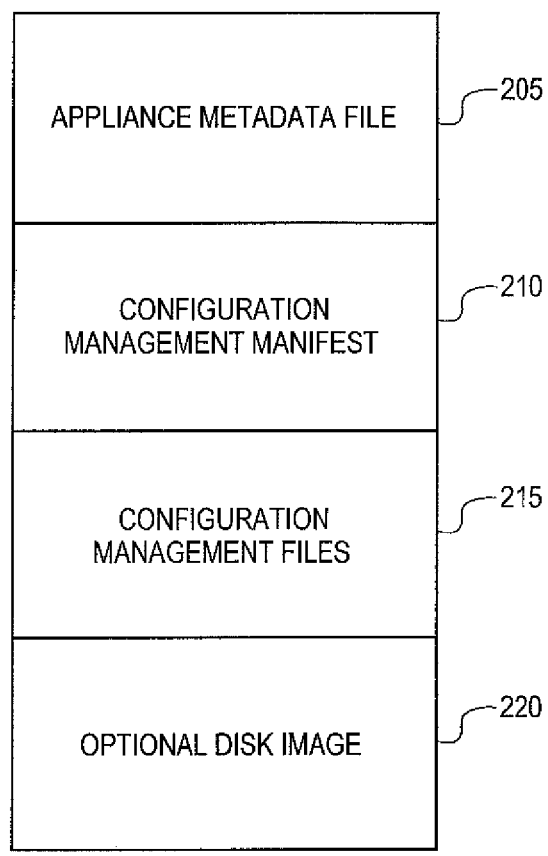
FIG. 2 illustrates an exemplary profile in accordance with various embodiments.

FIG. 2 depicts an exemplary profile 200 used the system 100 in accordance with various embodiments. It should be readily apparent to those of ordinary skill in the art that the profile 200 depicted in FIG. 2 represents a generalized schematic illustration and that other sections may be added or existing sections may be removed or modified.

As shown in FIG. 2, the profile can comprise an appliance metadata file section 205, a configuration management manifest section 210, a configuration management file section 215, and an optional disk image section 220. The appliance metadata file section 205 can be configured to comprise of information describing the requirements of the physical machine and reference to instructions on how to install the operating system and required software packages such as provided by Red Hat kickstart program. For example, the information contained in this section 205 can include distribution information, a kickstart file, a listing of operating system, version and type of software application, virtualization needs (e.g., amount of random access memory, amount of persistent storage, capabilities of central processing units required, etc.), the type of configuration management system being used, configuration management classes, etc.

The configuration management manifest section 210 can contain information related to the specification of configuration management files needed for the virtual machines belonging to the chosen profile. In some embodiments, the information contained in section 210 specifies a list of configuration management files such as configuration files and/or templates that can be pushed to the installed machines or descriptions of services/packages that need to be installed/ running, or users and groups that need to be created or in a certain state. The capabilities possible from a configuration management system should be well known to those practiced in the art of deploying configuration management systems. The configuration management files section 215 can be configured to contained the configuration management files specified in the configuration management manifest section 210. In various embodiments, the configuration management section 215 can be partitioned or referred to in two parts the recipe or "manifest" which describes what needs to be done, and separately, any content the configuration management system needs to apply (such as configuration files or templates). The optional disk image 220 can be configured to provide space for a user to attach disk images of the virtual machine, which may include the main disk image for the virtual machine if it is to be deployed as a binary image instead of being dynamically installed.

Figure 3:
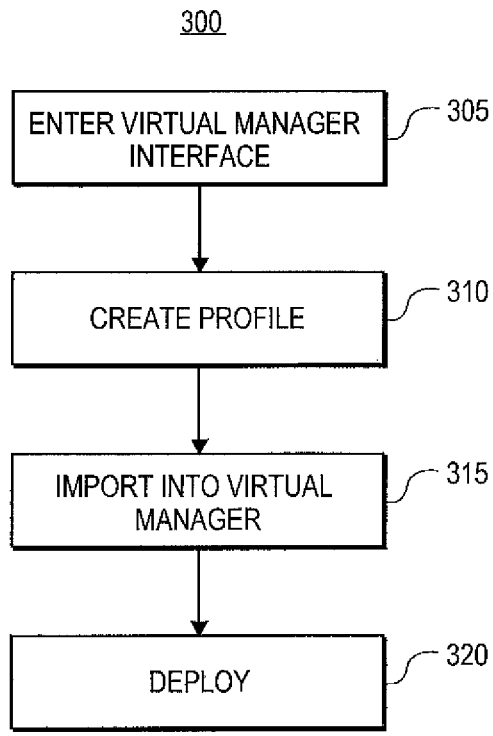
FIG. 3 depicts an exemplary flow diagram in accordance with various embodiments.

FIG. 3 illustrates an exemplary flow diagram 300 executed by the system 100 in accordance with various embodiments. It should be readily apparent to those of ordinary skill in the art that the flow diagram 300 depicted in FIG. 3 represents a generalized schematic illustration and that other steps may be added or existing steps may be removed or modified.

As shown in FIG. 3, a user can access the system 100 through either the GUI 110 or command line interface 115, in step 305. If the user uses the GUI 110, menu driven screens can direct the user to create a profile for a desired virtual machine, in step 310. Alternatively, the user can manually create a profile using the command line interface 115.

In step 315, the virtual manager server 105 can be configured to import the instantiated profile and is stored in the database 125. In step 320, the virtual manager server 105 can be configured to deploy the virtual machine as specified by the profile to a physical machine 135. More particularly, the profile is loaded in a selected physical machine 135 and the profile is activated to instantiate the virtual machine.

Figure 4:
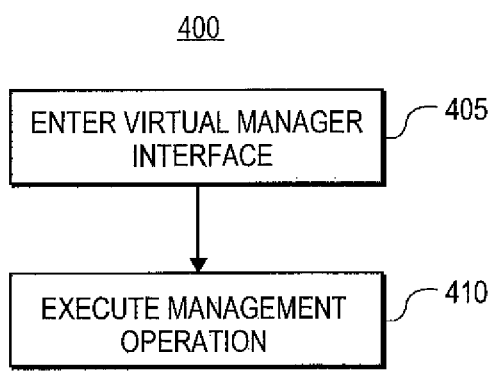
FIG. 4 illustrates another exemplary flow diagram in accordance with various embodiments.

FIG. 4 depicts another exemplary flow diagram 400 for the virtual manager server 105 in accordance with various embodiments. It should be readily apparent to those of ordinary skill in the art that the flow diagram 400 depicted in FIG. 4 represents a generalized schematic illustration and that other steps may be added or existing steps may be removed or modified.

As shown in FIG. 4, a user can access the virtual manager server 105 through one of the GUI interface 110 or the command line interface 115, in step 405. If the user is using the GUI interface 110, the user can be presented a screen that displays management commands for managing the deployed virtual machines, in step 410. More particularly, a user can select a virtual machine and execute a management command on the selected command. The management commands can comprise, although not limited to, start, pause, stop, delete, or migrate commands.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
provisioning, by a virtual manager server computing device, at least one physical machine to add the at least one physical machine to a collective server farm and to add software to enable the at least one physical machine to install virtual machines as directed by the virtual manager server computing device;
receiving, by the virtual manager server computing device, a set of requirements for a virtual machine (VM) specified by a user of the VM;
creating, by the virtual manager server computing device, a virtual profile associated with the VM and in view of the set of requirements provided by the user, wherein the virtual profile is maintained as a light-weight container and comprises an appliance metadata file section, a configuration management manifest section, a configuration management files section comprising files specified in the configuration manifest section, and an optional disk image section; and
distributing, by the virtual manager server computing device, the light-weight container of the virtual profile to a target physical machine of the at least one physical machine in response to a request from the user, wherein the target physical machine deploys the VM on the target physical machine in view of the provisioning and the virtual profile without use of a binary image file for the VM.

2. The method of claim 1, further comprising providing a graphical user interface module coupled to the virtual manager server computing device, wherein the graphical user interface module is to provide an interface between the user and the virtual manager server computing device.

3. The method of claim 2, further comprising managing any deployed VMs through the graphical user interface module.

4. The method of claim 1, further comprising managing, by the virtual manager server computing device, physical hardware on the at least one physical machine.

5. The method of claim 4, wherein the provisioning further comprises provisioning the at least one physical machine from bare metal.

6. The method of claim 3, wherein the managing any deployed VMs further comprises executing at least one of a start command, a stop command, a pause command, a delete command, or a migration command.

7. The method of claim 1, further comprising providing a database coupled to the virtual manager server computing device, wherein the database is to provide management of the virtual profile and other previously created virtual profiles.

8. The method of claim 7, wherein the database is further to manage at least one of distribution packages, monitored systems that are being tracked, or deployed VMs.

9. The method of claim 1, further comprising providing a configuration management system coupled to the distribution system, wherein the configuration management system is to centrally manage deployed VMs.

10. The method of claim 1, wherein the virtual profile further comprises an Extensible Markup Language (XML) header, a configuration file section, and an optional data image section.

11. A system comprising:
a memory;
a processing device communicably coupled to the memory;
a user interface communicably coupled to the memory and the processing device, the user interface to provide a communication interface and to receive a set of requirements for a virtual machine (VM) specified by a user of the VM; and
a configuration management system executable from the memory by the processing device, the configuration management system to:
provision at least one physical machine to add the at least one physical machine to a collective server farm and to add software to enable the at least one physical machine to install virtual machines as directed by the configuration management system;
create a virtual profile associated with the VM and in view of the set of requirements provided by the user, wherein the virtual profile is maintained as a light-weight container and comprises an appliance metadata file section, a configuration management manifest section, a configuration management files section comprising files specified in the configuration manifest section, and an optional disk image section; and
provide the light-weight container of the virtual profile to a distribution server to deploy the VM to a target physical machine of the at least one physical machine in response to a request from the user, wherein the target physical machine deploys the VM on the target physical machine in view of the provisioning and the virtual profile without use of a binary image file for the VM.

12. The system of claim 11, wherein the user interface is one of a graphical user interface and a command line interface.

13. The system of claim 12, wherein the user interface accepts commands that manage any deployed VMs.

14. The system of claim 13, wherein the commands that manage any deployed VMs further comprise executing at least one of a start command, a stop command, a pause command, a delete command, or a migration command.

15. The system of claim 11, further comprising a database coupled to the distribution server, wherein the database is to provide management of the virtual profile and other previously created virtual profiles.

16. The system of claim 15, wherein the database is further to manage at least one of distribution packages, monitored systems that are being tracked, and deployed VMs.

17. The system of claim 11, wherein the configuration management system is to centrally manage any deployed VMs.

18. The system of claim 11, wherein the virtual profile further comprises an Extensible Markup Language (XML) header, a configuration file section, and an optional data image section.

19. A non-transitory computer-readable storage medium including instructions that, when accessed by a processing device, cause the processing device to perform operations comprising:
provisioning, by a virtual manager server computing device comprising the processing device, at least one physical machine to add the at least one physical machine to a collective server farm and to add software to enable the at least one physical machine to install virtual machines as directed by the virtual manager server computing device;
receiving, by the virtual manager server computing device, a set of requirements for a virtual machine (VM) specified by a user of the VM;
creating, by the virtual manager server computing device, virtual profile associated with the VM and in view of the set of requirements provided by the user, wherein the virtual profile is maintained as a light-weight container and comprises an appliance metadata file section, a configuration management manifest section, a configuration management files section comprising files specified in the configuration manifest section, and an optional disk image section; and
distributing, by the virtual manager server computing device, the light-weight container of the virtual profile to a target physical machine of the at least one physical machine in response to a request from the user, wherein the target physical machine deploys the VM on the target physical machine in view of the provisioning and the virtual profile without use of a binary image file for the VM.

20. The non-transitory computer-readable storage medium of claim 19, wherein the operations further comprise managing the deployed VMs through a graphical user interface module communicably coupled to the virtual manager server computing device.

21. The non-transitory computer-readable storage medium of claim 19, wherein the operations further comprise managing physical hardware on the at least one physical machine.

22. The non-transitory computer-readable storage medium of claim 19, wherein the operations further comprise providing a database coupled to the virtual manager server computing device, wherein the database is to provide management of the virtual profile and other previously created virtual profiles.

* * * * *